United States Patent [19]

Sasada et al.

[11] Patent Number: 4,797,711
[45] Date of Patent: Jan. 10, 1989

[54] IMAGE SCANNING APPARATUS

[75] Inventors: Shigeru Sasada; Masahiro Yamamoto, both of Kyoto; Yoshio Shimizu, Osaka; Tsutomu Sumioka, Kyoto, all of Japan

[73] Assignee: Dainippon Screen Mfg., Co., Ltd., Japan

[21] Appl. No.: 94,519

[22] Filed: Sep. 9, 1987

[30] Foreign Application Priority Data

Sep. 10, 1986 [JP] Japan ............................ 61-137800[U]
Sep. 19, 1986 [JP] Japan ............................ 61-142528[U]
Nov. 12, 1986 [JP] Japan ............................ 61-172705[U]
Feb. 9, 1987 [JP] Japan ............................. 62-16601[U]

[51] Int. Cl.⁴ ..................... G03B 27/32; G03B 27/52
[52] U.S. Cl. ...................................... 355/32; 355/35; 355/67; 355/110; 362/32
[58] Field of Search ................. 355/67, 104, 105, 110, 355/1, 32, 35; 362/31, 32

[56] References Cited

U.S. PATENT DOCUMENTS 3,344,728 10/1967 MacQuarrie et al. .......... 355/110 X
4,128,332 12/1978 Rowe ..................................... 355/67
4,561,043 12/1985 Thompson ............................ 362/32

*Primary Examiner*—Richard A. Wintercorn
*Attorney, Agent, or Firm*—Ostrolenk, Faber, Gerb & Soffen

[57] ABSTRACT

An image scanning apparatus comprises a linear light source being arranged in parallel with a picture plane to be scanned. The linear light source is composed of a cylindrical rod made of a transparent material on which light diffusing reflecting layer of strip-shaped is provided along a longitudinal axis of the cylindrical rod and a lighting means for entering light fluxes into the inside of the rod at least from one end thereof to emit light fluxes each having directivity from the outer surface of the rod.

3 Claims, 6 Drawing Sheets

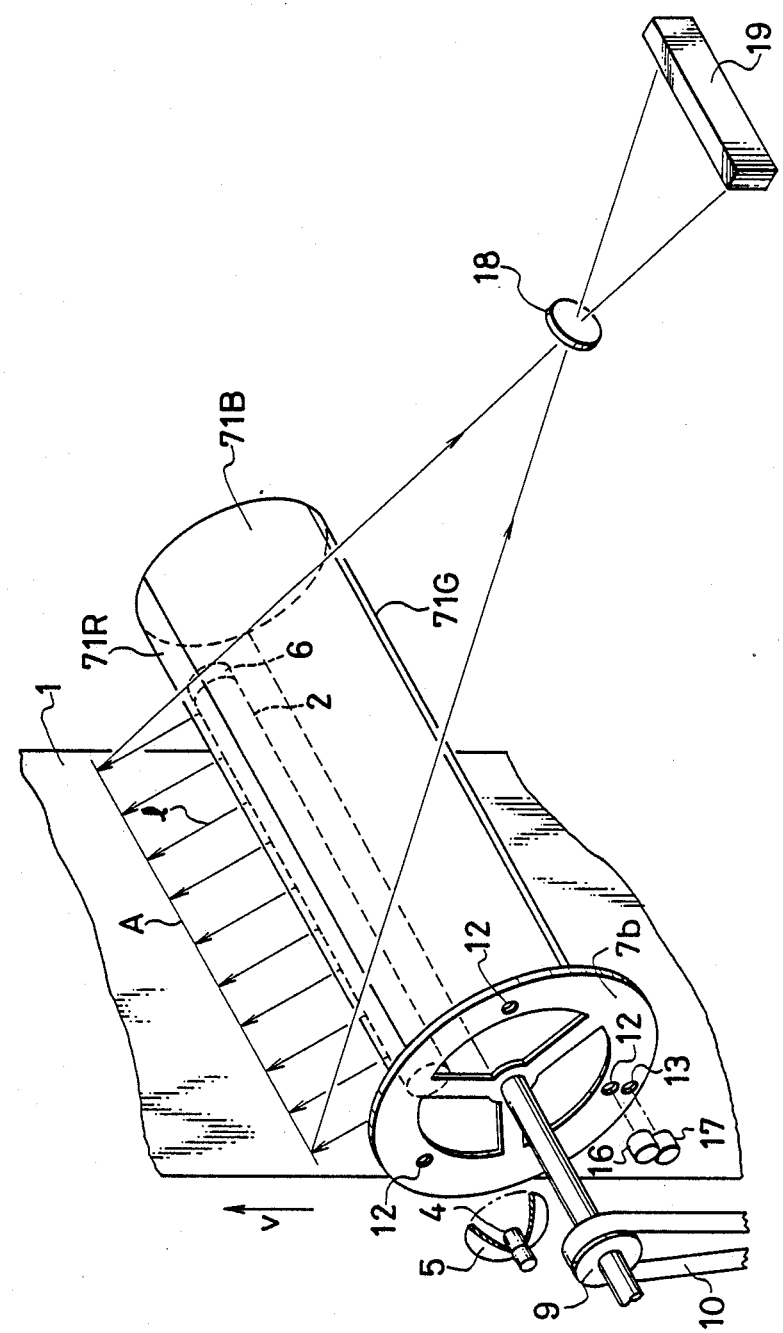

IMAGE SCANNING APPARATUS

BACKGROUND OF THE INVENTION

The present invention relates to an image scanning apparatus, and particularly to an apparatus which scans an original picture line by line with a rod shaped linear light source which is driven to cause relative motion with respect to an image plane to be scanned.

PRIOR ART

An image scanning apparatus using a linear light source has been utilized, for example, with a copying device, facsimile, etc. Examples of such light sources, include the use of a plurality of linearly arranged haloid electric bulbs, and fluorescent lamps. Such light sources, however exhibit the following draw backs.

The use of linearly arranged haloid bulbs reduced illuminance at each intermediate point between respective adjacent bulbs, which results in uneven distribution of the illumination on the plane to be scanned. There is also partial unevenness of the illuminance caused by differences by brightness by each of the bulbs. Another disadvantage is that the source loses its characteristic as a linear light source if even a single bulb is broken. The use of a plurality of haloid electric bulbs further has the disadvantages that is requires a large amount of electric power, and may cause an original picture and/or a cover glass of the original picture to be damaged by high calorific value generated by the large electric power. In apparatus utilizing a rod shaped bulb, it is possible to maintain an even distribution of illumination. However, the rod type bulb is weak in mechanical strength. Accordingly, apparatus utilizing a rod type bulb as a light source requires a large amount of electric power and generates high calorific value which is liable to damage the original picture and the cover glass thereof as with the use of haloid bulbs. An apparatus provided with a fluorescent lamp which has the merits of requiring a small amount of electric power and generating low calorific value. However, there are only a limited number of commercially available lengths of fluorescent lamps, so that they cannot be freely applied. In addition, fluorescent lamps are unstable as a light source.

When using three fluorescent lamps, each of which radiates spectrum of one of three colors among red, green and blue respectively, as a scanning light source there are further problems when reproducing a color picture image by carrying out color separation. That is, (i) in order to install the three fluorescent lamps a large space is required; (ii) light quantity radiated from the lamps is unstable immediately after they are turned on and when the surrounding temperature is variable; (iii) durable life is relatively short and is liable to deteriorate; and (iv) maintaining balance among the three color lights is quite difficult, for degree of deterioration of each of the three lamps is different from one another.

SUMMARY OF THE INVENTION

It is an object of the present invention to provide a linear light source for an image scanning apparatus in which problems of the afore-described conventional apparatus have been solved.

It is another object of the present invention is to provide a rod shape linear light source which can evenly project illuminating light over the full length thereof.

It is further object of the present invention to provide a linear type light source for color separation.

These and other objects, advantages and features of the present invention will become more fully apparent with reference to the specification and the accompanying drawings, wherein;

BRIEF DESCRIPTION OF THE DRAWINGS

FIG. 7 shows a schematic perspective view of another embodiment of an image scanning apparatus according to the present invention;

DESCRIPTION OF PREFERRED EMBODIMENT

Figure 1:
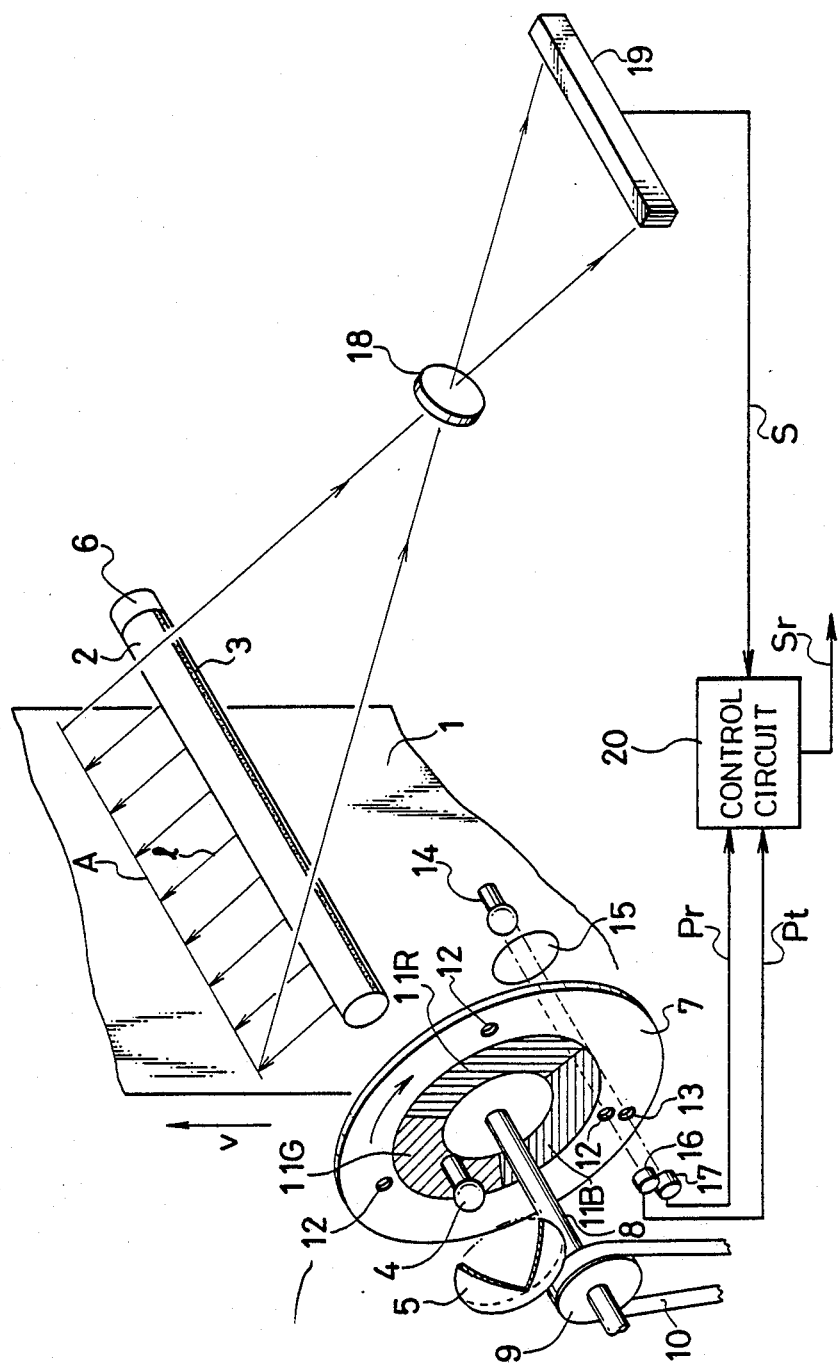
FIG. 1 shows a schematic perspective view of an image scanning apparatus as an embodiment of the present invention.

FIG. 1 is a perspective view showing an embodiment of an image scanning apparatus to which a light source according to the present invention is applied. An original picture (1) to be scanned is driven in the direction indicated by an arrow mark "v", and a linear light source composed of a cylindrical rod (2) which is made of a transparent material such as quartz etc. is disposed parallel to the plane of the original picture (1). On the outer surface of one side of the rod (2) opposite to a part of the rod (2) which faces a linear area (A) to be scanned of the original picture (1) there is provided a linear and/or stripe-like diffused reflection layer (3). The diffused reflection layer (3) is formed to an appropriate thickness by applying a suspension which is made by suspending minute white powders of a material having high refractive index such as titanium, kalium titanic oxide, zinc oxide, etc. in a suitable solvent such as silicone rubber or the like. A lamp (4) and a concave mirror (5) are disposed so as to be oppose one of the ends of the cylindrical rod (2), and light fluxes emitted from the lamp (4) are reflected by the concave mirror (5) to the one end plane of the rod (2), and the reflected light fluxes are incident to the inside of the rod (2).

At the opposite end of the rod (2) there is disposed a flat mirror (6) to reflect the light fluxes reaching the other end plane in the inside of the rod (2). A filter disk (7) is provided between the lamp (4) and the end plane of the rod (2). The filter disk (7) is rotatably supported on a shaft (8), and driven to rotate by a driving mechanism comprising a pulley (9) mounted on the shaft (8) and a belt (10). On the filter disk (7) there are mounted three color filters (11R), (11G) and (11B) of sectoral shapes each of which has a central angle of 120° within the circumference of a circle which is aligned with a light path from the concave mirror (5) to the rod (2). The three color filters change the light passing therethrough to red (R), green (G) and blue (B) periodically according to the rotation of the filter disc (7). The outer portion of the circumference of the afore-described circle of the filter (7) is made of an opaque material, and three holes (12) are provided for generating timing pulses and a hole (13) is provided for generating a rotation counting pulse.

A lamp (14) and a condenser lens (15) are provided on one side of the filter disk (7), and two photocells (16) and (17) are provided on the other side thereof. Photocells (16), (17) are disposed so that light fluxes passing through the hole (12) may be incident on the photocell (16) and light fluxes which pass through the hole (13) may be incident to the photocell (17).

As shown in FIG. 1, the three timing pulse generating holes (12) are located at positions where the light fluxes from the lamp (14) may pass through, when the light fluxes passing through one of boundary portions of the color filters (11R), (11G) and (11B) also pass through an optical pass to the rod (2), and the hole (13) is located at any suitable position, preferably at a position through which light fluxes passing through any one of the holes (12) may pass synchronously, that is, it is preferable to locate the hole (13) at a position where the light fluxes which pass through any one of the holes (12) pass through it synchronously.

As described above, the photocell (16) generates a timing pulse (Pt) each time the color of the light fluxes which impinge upon the rod (2) changes, and the photocell (17) generates a rotation counting pulse (Pr) once every rotation of the filter disk (7). These pulses (Pt) and (Pr) are input to a control circuit (20).

Figure 2:
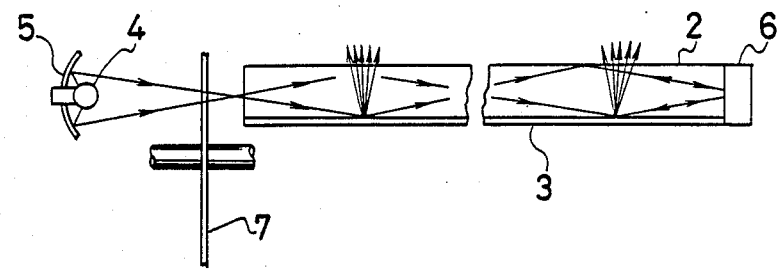
FIG. 2 is a sectional view of construction of a quartz rod light source and optical passes of light rays.
Figure 3:
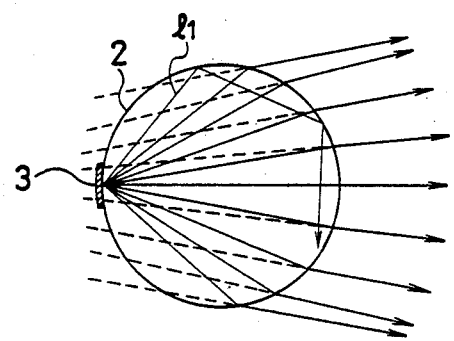
FIG. 3 is a sectional view of the quartz rod showing states of diffused reflection light rays on a diffused reflection layer.

The light fluxes entering in the left side of the rod (2) are reflected internally off of the outer side walls of the rod (2) (the rod acts as an internally reflected light rod), as shown in FIG. 2, guided to the right end of the rod (2) as viewed in FIG. 2. The light is then reflected by the flat mirror (6) and again internally reflected towards the left end of rod 3 as viewed in FIG. 2. The light fluxes reflecting off of any portion of the inner side walls other than the portion containing the diffused reflection layer (3) are totally reflected on the glassy surface of the inside of the rod (2). The light fluxes reflecting off of the diffused reflection layer (3), however, are reflected diffusedly. As shown in FIG. 3, among the diffusedly reflected light fluxes a light flux ($l_1$) which is incident to the inner surface of the rod (2) at an angle larger than the critical angle is internally reflected off the inner surface of the rod (2) until it again reaches to the diffused reflection layer (3).

Other light fluxes are incident to the inner surface of the rod (2) at an angle smaller than the critical angle and are therefore refracted to emit outwardly from the rod (2) directivities from the outside of the rod (2), and thus emits light fluxes which have a color corresponding to the colored filter (11R), (11G) and (11B) through which the light fluxes pass, and is introduced into the rod (2) at any given time.

The emitted colored light fluxes are emitted along the overall length of the rod (2) with nearly even intensity. Accordingly, from the rod (2) colored flat (i.e. even) light fluxes indicated by an arrow mark "l" in FIG. 1 are emitted to illuminate the linear area (A) on the original picture (1). The light fluxes reflected from the linear area (A) are projected by a lens (18) to a linear photoelectric transducer (19), for example, such as a CCD line sensor etc., to focus an image of the area (A) thereon. Basing on the above-described construction, electrical signals corresponding to color tone and degree of brightness of each of corresponding pixel points on the area (A), that is, color separated image signals of each of the corresponding pixel points on the area (A) are output from each of the photocells composing the photoelectric transducer (19). Thus, three kinds of color separation picture signals (S) of R, G and B colors are sequentially output in response to cyclical rotation of the three color filters of the filter disk (7). These color separation picture signals (S) are sent to the control circuit (20), and stored in a suitable memory device according to a writing command signal controlled by the timing pulses (Pt) generated by the photocell (16).

After the color separation signals (S) of the three colors R, G and B have been stored in the memory device in response to a single rotation of the filter disk (7), according to a command basing on the rotation counting pulse (Pr) generated by the photocell (17), the three kinds of color separation signals (S) are read out of the memory device in parallel, and processed by a color correcting operation circuit to be stored in a memory device having a large capacity such as magnetic disc etc., or output to a recording scanner unit as recording signals (Sr). The color correcting operation circuit, the memory device and those control devices required therefor may be constructed in accordance with those well known color separation scanner having been used in common photochemical works, accordingly, minute description there for is abbreviated.

After a set of color separation signals (S) have been processed, based on the one rotation counting pulse (Pr), the memory device is cleared. Then, according to the movement of the original picture (1) in the direction indicated by the arrow mark "v", the next area to be scanned in the original picture (1) is moved to a position at which the area is illuminated by the rod (2), and the same color separation scanning operation is carried out. In the embodiment shown in FIG. 1, the light source including the rod (2) and the optical system (composing of the lens, the mirrors etc.) is set at a predetermined position, and the original picture (1) is moved above case, of course, it is possible to construct the apparatus so that the original picture (1) is fixed and the light source is moved.

Further, in the embodiment shown in the drawings, the filter disk to which the three color filters are disposed is rotated so as to generate the three color separation signals sequentially. Construction of the invention is not restricted to foregoing embodiment and for example, the following modification may be used. In this modification the whole area of a desired picture is scanned to store all picture image signals in memory means. Then, by changing a color filter, the same picture is scanned and picture image signals generated therefrom are stored in the memory means. By repeating this process for each required separation color, a plurality of color separation signals are stored in the memory means and the stored color separation signals may be read out in parallel to input to the color correcting circuit. In this case, instead of changing the color filters by the rotation of the filter disk as the above-described embodiment, filters may be exchanged by mounting filters in a sliding frame or each of the filters may be mounted in respective single frames and the frames may be moved in the horizontal or vertical direction by manual operation. However, in this case it is necessary for storing all picture image signals over the whole area of the original picture, so that a memory device of a large capacity is required.

Other Embodiments:

In the present invention in addition to the above-described embodiment there can be many kinds of variations as follows.

Variation 1

In the apparatus shown in FIG. 1, between the filter disk (7) and the lamp (4) a heat preventing filter for cutting infrared ray may be provided. The filter prevents the color filters (11R), (11G) and (11B) from being damaged.

Variation 2

The apparatus shown in FIG. 1 may be modified by removing the holes (12), (13) located on the filter disk (7), the lamp (14), the lens (15) and the photocells (16), (17), and replacing them with a rotary encoder connected with the shaft (8) of the filter disk (7) to generate pulses corresponding to rotating angles of the filter disk (7) by which the number of the pulses is counted and is used to conduct the instants at which the filters are changed. As described the above, the timing between the color filters and the photoelectric transducer (19) can be easily adjusted. Particularly, when the photoelectric transducer (19) is formed using a CCD, each of the color lights is prevented from being mixed, and pure color signals can be obtained. This modification can be designed in accordance with such a well known technique as disclosed in Japanese Patent Laid-Open Publication No. 60-236569.

Variation 3

Figure 4A:
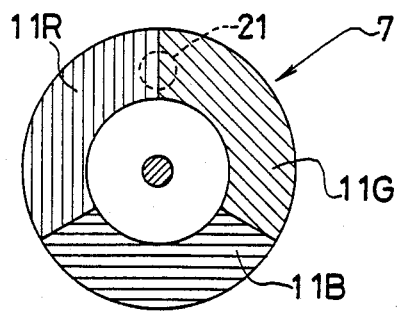
FIG. 4A shows an example of a filter disk.
Figure 4B:
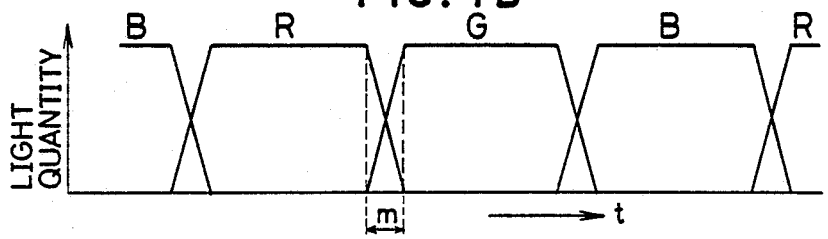
FIG. 4B is a time chart representing variation of light quantities caused by the filter disk shown in FIG. 4A.
Figure 5A:
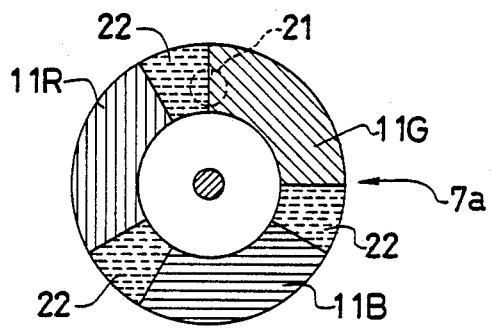
FIG. 5A shows another example of the filter disk.
Figure 5B:
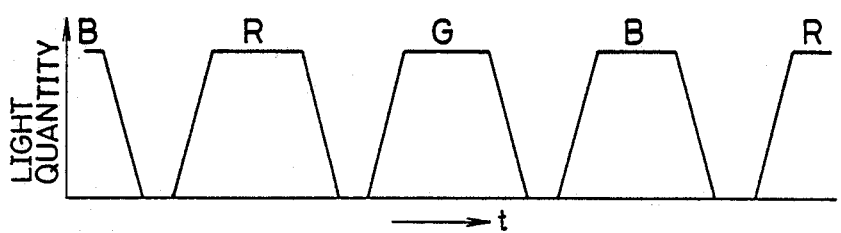
FIG. 5B is a time chart representing variation of light quantities caused by the filter disk.

Since the color filters (11R), (11G) and (11B) are located immediately adjacent one another, as shown in FIG. 4A, light fluxes passing between the lamp (4) and the rod (2) will periodically pass through two adjacent filters (as shown at 21) with the result that two colors of respective adjacent sides of the two color filters are mixed, producing impure color(s). That is, since the light fluxes have certain size, color changing in the filter colors is not carried out instantaneously, accordingly, overlapping of the two kinds of colors occurs. FIG. 4B is a time chart which shows the status of the color overlapping, for example, when the boundary between the red filter (R) and the green filter (G) intersects the optical path of the light fluxes (21). As can be seen, the quantity of red light begins to decrease gradually when the boundary between two filters reaches to the edge of the light fluxes (21), and reduces to 0 when the boundary finishes passing through the light fluxes (21). On the other hand green light gradually increases from the 0 level to the maximum level. Accordingly, during the time period (m), while the boundary between the red and green filters is located in the optical path of the light fluxes (21), color of the flat light fluxes projected from the rod (2) is impure resulting from mixing green and red colors. Accordingly, the photoelectric transducer (19) can not generate clear color separation signals. In FIG. 5A there is shown an improved embodiment in which the afore-mentioned drawback is eliminated. In this embodiment opaque regions (22) are inserted between respective adjacent color filters (11R), (11G) and (11B). FIG. 5B is a time chart showing variation in light quantity resulting from the embodiment in which a filter disk (7a) shown in FIG. 5A is used, and by means of each of the opaque regions provided between the respective color filters, the rising of the light level of one color does not start until level of light of the preceding color becomes 0. To illuminate the original picture (1) effectively it is preferred to make the size of each of the opaque regions (22) as small as possible so that it will only shade the light fluxes (21).

Variation 4

Figure 6:
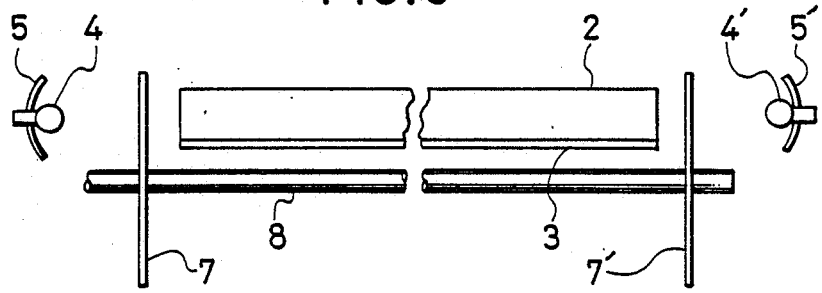
FIG. 6 is another arrangement of the lamps and the filter disk.

As shown in FIG. 6, at the both ends of the rod (2) from which the flat mirror (6) is removed there are provided a pair of lamps (4), (4'), a pair of concave mirrors (5), (5') and a pair of filter disks (7), (7'), and the two filter disks (7), (7') are mounted on the common shaft (8) or rotated synchronously so that same type of color light fluxes may be input from the both ends thereof. According to this construction, the quantity of light illuminating the original picture (1) increases and a more even distribution of light intensity of the flat light fluxes (l) can be expected. That is, based on the $\cos^4 \theta$ law in the lens system, unevenness in distribution of light intensity, lower light intensity at the central portion of the rod than those at the end portions is somewhat compensated. Thus, total shading compensation can be facilitated.

Variation 5

It is not always the best for achieving the object of the invention to make each of the central angles of the respective color filters (11R), (11G) and (11B), and therefore each of the areas of the color filters through which the light fluxes pass (hereinafter, size of the area is referred to "circumferential size"), equal. By adjusting the areas of the color filters (11R), (11G) and (11B) so that final sensitivity of each of the colors which is obtained by considering and summing distribution of color components of the light fluxes from the lamp (4), transmittance of each of the color filters and color sensitivity of the photoelectric transducer (19) may become equal, and according to them, the read rate of each of the elements (photocells) of the photoelectric transducer (19) may be varied for respective colors.

Variation 6

The apparatus shown in FIG. 1 performs photoelectrical scanning by means of light fluxes reflected on the surface of the original picture. However, it is also possible to adapt the apparatus so that it may scan a transparent original picture such as a color film etc. by light fluxes transmitted through the original picture. In this case the lamp (4), the filter (7) and the rod (2) are additionally provided at the opposite side to the side at which the original picture (1) is mounted so that the area (A) is illuminated from the back side thereof.

Variation 7

On the filter disk (7) shown in FIG. 1 there are mounted three color filters of sectoral shapes, it is also possible, however, to construct the apparatus so that it may be provided with a filter disk on which a plural sets of color filters lined up in the order of R, G and B colors and each having smaller circumferential size is applied. In this variation since a plurality sets of R, G and B separation color signals are generated during one revolution of the filter disk, with the same rotating speed, higher speed color separation scanning operation comparing with that of the filter disk shown in FIG. 1 can be provided.

Variation 8

In FIG. 7 there is shown another embodiment in which a filter cylinder is used instead of the filter disk. Each of three color filters (71R), (71G) and (71B) is disposed at respective three sectors formed by dividing the outer side surface of the filter cylinder into three adjacent areas. The rod (2) is positioned at the center of the cylinder so as to be parallel to a longitudinal axis of the cylinder. In FIG. 7 all parts or components which are same with those of shown in FIG. 1 are indicated by the identical reference numbers and symbols. Light fluxes emitted from the lamp (4) and projected from the rod (2) as flat light fluxes transmit the arched color filters (71R), (71G) or (71B) to illuminate the area (A) on the original picture (1).

Variation 9

Figure 8:
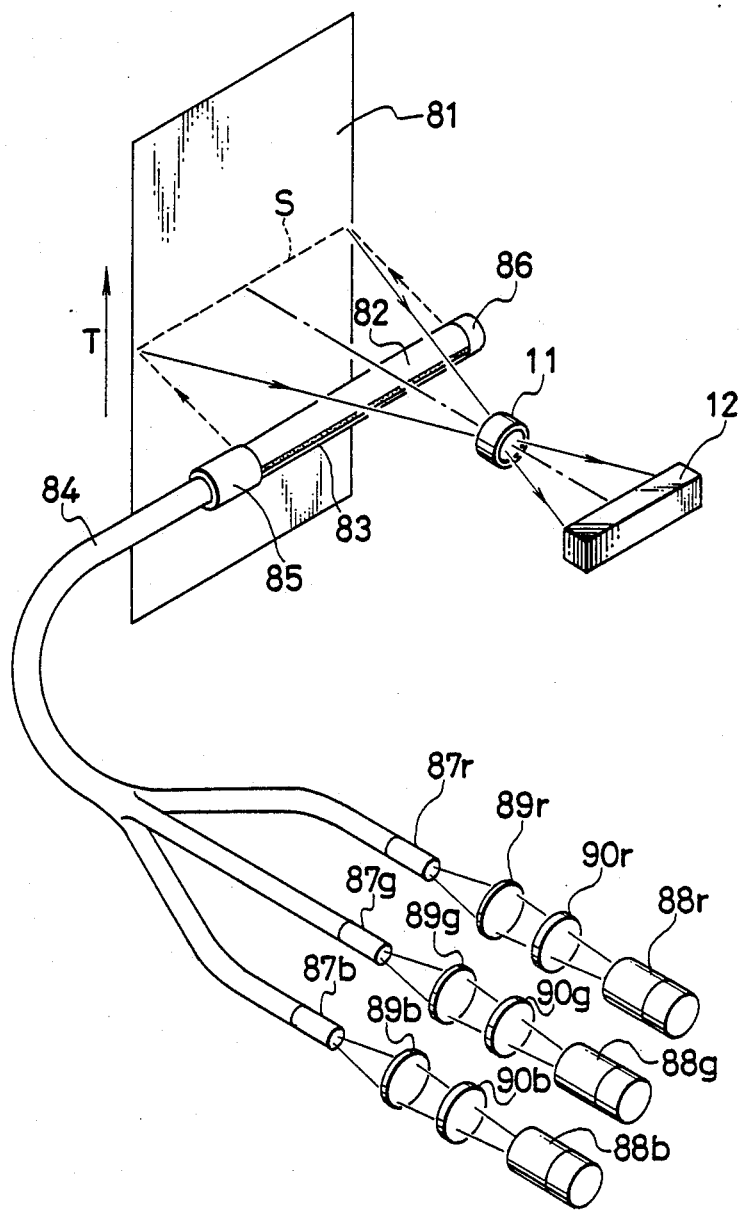
FIG. 8 is a schematic perspective view of other embodiment of the image scanning apparatus according to the present invention.
Figure 9:
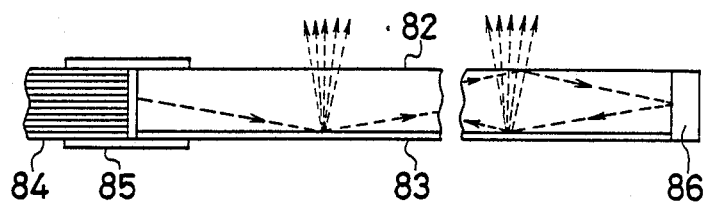
FIG. 9 is a sectional view of a light applied to the apparatus shown in FIG. 8.

In FIG. 8 other embodiment in which light fluxes are emitted into the rod (2) by a bundle of optical fibers provided between light sources is shown. A light emitting tip of a light guide means (84), composed of a bundle of the optical fibers, is connected to one end of a rod (82) with a sleeve (85). At the other end of the rod (82), as with the rod (2) shown in FIG. 1, a mirror (86) is provided to reflect light fluxes reaching this end back into the rod (82). As with each of the afore-described embodiments, a diffused reflection layer (83) is disposed on the rod (82) and flat light fluxes are emitted from the rod (82). The light guide (84) is divided into three branches at the other end opposite to the end at which the sleeve (85) is connected. Those three branches constitute light entering tips (87r), (87g) and (87b), respectively, and into the tips light fluxes emitted from lamps (88r), (88g) and (88b), respectively, corresponding to each of the tips are entered through condensers (89r), (89g) and (89b), respectively. Between the lamp (88r) and the condenser (89r) there is provided a red filter (90r), between the lamp (88g) and the condenser (89g) a green filter is provided, and a blue filter is also provided between the lamp (88b) and the condenser (90b). However, if sufficient light collecting efficiency is obtained, by eliminating the condensers (89r), (89g), (89b), the color filters (90r), (90g), (90b) and the light guides (87r), (87g), (87b) may be closely contacted, respectively.

Driving circuits and controlling switches (not shown) are provided to the lamps (88r), (88g) and (88b), respectively, and they are controlled so that each of them may be turned on or turned off independently. That is, upon scanning a color picture (81), the three lamps are cyclically lit to transmit the corresponding color filters to project colored lights into the rod (82). Thus, color of flat light fluxes projected from the rod (82) are changed cyclically.

The lamps (88r), (88g) and (88b) have each emit white colored light which is stabile in light intensity and generates low caloric value (i.e., low heat). A Xenon lamp provides the afore-described characteristics. The Xenon lamp is one of the best for the apparatus shown in FIG. 8 for the following reasons. It emits natural white color light, so the same as solar light, it generates extremely stable light intensity when operated under a certain condition, it emits substantially continuous pulsed light frequency of about 100 Hz which is applicable to the photoelectric transducer, it is capable of being turned on and off at high speeds, it emits light of 10 number and has a long durable life, it has low capacity and small caloric value, etc. In lieu of a Xenon lamp a light emitting diode (LED) may be used. Any LED which can emit colored light of R, G or B may be used. When using such LEDs, color filters can be eliminated from the optical system. Of course, any lamps other than the afore-mentioned ones may be applied, since they can emit color light of R, G or B.

Variation 10

Figure 10:
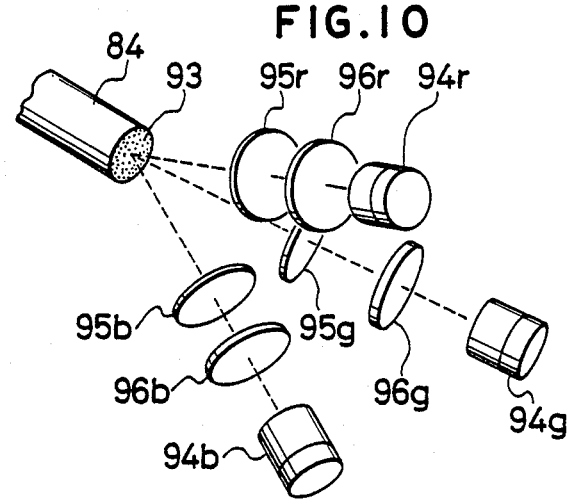
FIGS. 10 and 11 show other constructions of lamps and color filters being respectively applied to the apparatus shown in FIG. 8.

In FIG. 10 there is shown a variation of the light guide (84). In this embodiment light entering tip (93) of the light guide (84) is not divided, and light fluxes from three sets of lamps (94r), (94g), (94b), condensers (95r), (95g), (95b) and color filters (96r), (96g), (96b) commonly enter into the tip (93). The three optical axes of these sets are arranged so that they form a trigonal pyramid, the apex of which is the center of the light entering tip (93) of the light guide (84). Each relative position of the respective optical axes to the tip (93) is fundamentally same. However, it may be varied according to intensity of each of the color lights. In this embodiment, as well as that of shown in FIG. 8, the three lamps (94r), (94g) and (94b) are turned on cyclically so that color scanning of the original picture (1) may be carried out. According to this embodiment, since there is no necessity for separating or dividing the light guide (84), a quite simple construction of the apparatus can be achieved.

Variation 11

Figure 11:
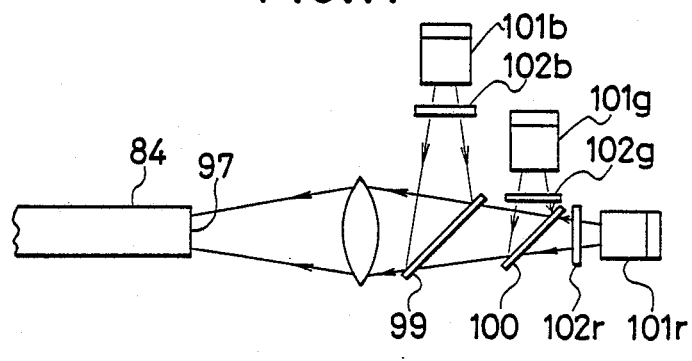

In FIG. 11 there is shown a further embodiment of the light guide (84). In this embodiment, as in the preceding embodiment, a light entering tip (97) of the light guide (84) is not divided, but a condenser (98) is provided on an optical axis which aligns with the center axis of the light guide (84), and at the rear side thereof two half reflecting mirrors (99) and (100), which separate the optical axis or light fluxes into three optical axes or light fluxes, are provided. On each of the three separated optical axes lamps (101r), (101g), (101b) are arranged color filters (102r), (102g), (102b), respectively. The light fluxes emitted from each of the lamps and transmitted to the respective color filters are composed by the half reflecting mirrors (99) and (100), and by aligning with the common optical axis they enter into the light entering tip (97) of the light guide (84) through the condenser (98).

In the embodiments shown in FIGS. 8, 10 and 11 colored light fluxes only enter into the rod (82) from one end thereof. However, it is also possible to achieve even distribution of light fluxes, as shown in FIG. 6, by removing the mirror (86) and providing light guides and lighting systems on both ends of the rod (82), respectively, so that light fluxes may enter into the rod (82) from the both sides thereof and increase intensity of the light fluxes.

Heretofore, descriptions have been made relating to the embodiments of the present invention which are applied to color separation working, however, of course, they are applicable to monochrome working. That is, it is obvious to utilize the apparatus to monochrome workings such as workings for white-and black picture by applying a lamp which emits white light fluxes as a light source and eliminating color filters from the apparatus.

What is claimed is:

1. A linear light source for use in an image scanning apparatus, said light source comprising:
   (a) a cylindrical rod made of a transparent material which is arranged in parallel with a picture plane of an original picture to be scanned;
   (b) an elongated strip-like diffused reflection layer provided on said cylindrical rod along a longitudinal axis of said cylindrical rod; and (c) light means directing light fluxes into one side end of said cylindrical rod, said light means comprising:
  (1) a lamp;
  (2) a concave mirror which reflects light fluxes emitted from said lamp into one side end of said rod so as to cause light fluxes to enter into said cylindrical rod through said one side end;
  (3) a filtering device for selectively placing any one of a plurality of color filters between said one side end of said cylindrical rod and said lamp; and
  (4) a control device for generating a control pulse each time a different said color filter is placed between said lamp and said one side end of said cylindrical rod and generating a control pulse during each changing period of said filtering device.

2. A linear light source for use in an image scanning apparatus, said light source comprising:
  (a) a cylindrical rod formed of a transparent material which is arranged in parallel with a picture plane of an original picture to be scanned;
  (b) an elongated strip-like diffused reflection layer provided on said cylindrical rod along a longitudinal axis of said cylindrical rod; and
  (c) light means for directing light fluxes into one side end of said cylindrical rod, said light means comprising:
    (1) a lamp;
    (2) a concave mirror which reflects light fluxes emitted from said lamp into said one side end of said rod ao as to cause light fluxes to enter said cylindrical rod; and
    (3) a filtering device for selectively placing any one of a plurality of color filters between said one side end of said cylindrical rod and said lamp, said filtering device comprising a filtering disk on which a plurality of color filters of sectral shape are mounted, said filter device being rotatable in such a manner that said color filters are sequentially placed between said lamp and said one side end of said cylindrical rod, said filtering disk including opaque areas provided between adjacent said sectral shaped color filters.

3. A linear light source for use in an image scanning apparatus, said light source comprising:
  (a) a cylindrical rod formed of a transparent material which is arranged in parallel with a picture plane of an original picture to be scanned;
  (b) an elongated strip-like diffused reflection layer provided on said cylindrical rod along a longitudinal axis of said cylindrical rod; and
  (c) light means for directing light fluxes into one side end of said cylindrical rod, said light means comprising:
    (1) a lamp located at a position opposed to one side end plane of said rod so as to cause light fluxes to enter said rod through said side end; and
    (2) a filtering device for selectively placing any one of a plurality of color filters between said one side end of said cylindrical rod and said lamp, said filtering device comprising a filtering disk on which a plurality of color filters of sectral shape are mounted, said filter device being rotatable in such a manner that said color filters are sequentially placed between said lamp and said one side end of said cylindrical rod, said filtering disk including opaque areas provided between adjacent said sectral shaped color filters.

* * * * *